US012597870B2

(12) United States Patent
Tan et al.

(10) Patent No.: US 12,597,870 B2
(45) Date of Patent: Apr. 7, 2026

(54) CONTROL CIRCUIT FOR MULTI-PHASE POWER CONVERSION CIRCUIT AND MULTI-PHASE POWER SUPPLY

(71) Applicant: SG MICRO CORP, Beijing (CN)

(72) Inventors: Lei Tan, Beijing (CN); Junzhe Hao, Beijing (CN); Xiang Yu, Beijing (CN); Zhongwei Qian, Beijing (CN); Bin Chen, Beijing (CN)

(73) Assignee: SG MICRO CORP, Beijing (CN)

( * ) Notice: Subject to any disclaimer, the term of this patent is extended or adjusted under 35 U.S.C. 154(b) by 191 days.

(21) Appl. No.: 18/578,026

(22) PCT Filed: Aug. 18, 2022

(86) PCT No.: PCT/CN2022/113208
§ 371 (c)(1),
(2) Date: Jan. 10, 2024

(87) PCT Pub. No.: WO2023/284888
PCT Pub. Date: Jan. 19, 2023

(65) Prior Publication Data
US 2024/0322710 A1 Sep. 26, 2024

(30) Foreign Application Priority Data
Jul. 16, 2021 (CN) .......................... 202110805333.1

(51) Int. Cl.
*H02M 7/539* (2006.01)
*H02M 7/5395* (2006.01)

(52) U.S. Cl.
CPC ................................. *H02M 7/5395* (2013.01)

(58) Field of Classification Search
CPC ............................ H02M 7/539; H02M 7/5395
See application file for complete search history.

(56) References Cited

U.S. PATENT DOCUMENTS 7,061,215 B2 6/2006 Harris
7,659,789 B2 2/2010 Zhu et al.
(Continued)

FOREIGN PATENT DOCUMENTS

CN 1841907 A 10/2006
CN 101159413 A 4/2008
(Continued)

OTHER PUBLICATIONS

International Search Report and Written Opinion for International Application No. PCT/CN2022/113208, dated Oct. 24, 2022, 8 pages.
(Continued)

*Primary Examiner* — Adolf D Berhane
(74) *Attorney, Agent, or Firm* — Westman, Champlin & Koehler, P.A.

(57) ABSTRACT

A control circuit for a multi-phase power conversion circuit and a multi-phase power supply are provided. The conversion circuit includes a plurality of switching circuits which have output terminals being coupled together to supply power to a load. The control circuit includes an error amplifier, a pulse width modulation circuit, and a multi-phase logic control circuit. The multi-phase logic control circuit generates a plurality of PWM signals according to an on time signal, which are delayed phase by phase and control on and off states of the plurality of switching circuits, and each of which has a pulse width being consistent with the on time signal. This reduces the circuit size and cost of the multi-phase power supply controller, and solves the problem of phase-to-phase current oscillation in a case that the switching circuits operate under duty ratios independent for various phases.

13 Claims, 6 Drawing Sheets

200

(56)                    References Cited

U.S. PATENT DOCUMENTS

| | | | |
|---|---|---|---|
| 8,148,967 | B2 | 4/2012 | Xing et al. |
| 12,191,770 | B2 * | 1/2025 | Liu ..................... H02M 3/1586 |
| 2005/0073288 | A1 | 4/2005 | Harris |
| 2009/0179709 | A1 | 7/2009 | Zhu et al. |
| 2010/0033153 | A1 * | 2/2010 | Xing ..................... H02M 3/156 |
| | | | 323/288 |
| 2013/0169249 | A1 * | 7/2013 | Lee ..................... H02M 3/1584 |
| | | | 323/272 |
| 2014/0292291 | A1 | 10/2014 | Lee et al. |
| 2016/0338157 | A1 * | 11/2016 | Kurishita ............. H05B 45/397 |
| 2021/0028704 | A1 | 1/2021 | Jiang et al. |
| 2025/0132682 | A1 * | 4/2025 | Tan ..................... H02M 3/1586 |

FOREIGN PATENT DOCUMENTS

| | | | |
|---|---|---|---|
| CN | 101160714 | A | 4/2008 |
| CN | 101753024 | A | 6/2010 |
| CN | 104009627 | A | 8/2014 |
| CN | 112421954 | A | 2/2021 |
| JP | H09231749 | A | 9/1997 |
| TW | I274975 | B | 3/2007 |
| TW | 201328144 | A | 7/2013 |

OTHER PUBLICATIONS

First Office Action, including Search Report, for Chinese Patent Application No. 202110805333.1, dated Feb. 29, 2024, 21 pages.

* cited by examiner

CONTROL CIRCUIT FOR MULTI-PHASE POWER CONVERSION CIRCUIT AND MULTI-PHASE POWER SUPPLY

CROSS-REFERENCES TO RELATED APPLICATION

This application is a Section 371 National Stage application of International Application No. PCT/CN2022/113208, filed on Aug. 18, 2022, which published as WO 2023/284888 A1, on Jan. 19, 2023, not in English, and claims the priority to the Chinese patent application No. 202110805333.1, filed on Jul. 16, 2021, and entitled "CONTROL CIRCUIT FOR MULTI-PHASE POWER CONVERSION CIRCUIT AND MULTI-PHASE POWER SUPPLY", the entire contents of which are incorporated herein by reference in their entireties.

FIELD OF TECHNOLOGY

The present disclosure relates to the technical field of switching power supplies, and more particularly, to a control circuit for a multi-phase power conversion circuit and a multi-phase power supply.

BACKGROUND

The exponential growth in the scale of Internet of Things (IoT) cloud services has driven significant advances in data centers, networking and telecom equipment, while the continuous increase in data and information poses new challenges to the processing efficiency of servers in data centers. Therefore, how to efficiently provide power and heat dissipation for these devices while minimizing power consumption has become an important topic in the field of conventional power supply technologies.

Multi-phase power supply is a technology that connects multiple power conversion circuits in parallel and distributes a switching modulation process to different phases to achieve the regulation and control of the power supply. The PWM (pulse width modulation) signals between phases in the multi-phase power supply can be the same or shifted by a certain phase, so that frequency fluctuation seen at the output and the input is the product of a switching frequency in each phase and a number of phases, thereby reducing the need for filter capacitors and reducing a current impact on the input. At the same time, it can speed up the response to load changes.

FIG. 1 shows a schematic circuit diagram of a multi-phase power supply according to the prior art. As shown in FIG. 1, a conventional multi-phase power supply 100 includes a multi-phase power supply controller 110, multi-phase power conversion circuits 101-104 (a four-phase power supply as an example in FIG. 1), and a feedback control circuit 120. The power conversion circuit of each phase comprises a driver, switching transistors T1 and T2, an inductor Lx and an output capacitor Cout. The switching transistors T1 and T2 are coupled between an input voltage Vin and a ground, a first end of the inductor Lx is coupled to a intermediate node of the switching transistors T1 and T2, a second end of the inductor Lx is coupled to a first end of the output capacitor Cout, and a second end of the output capacitor Cout is coupled to the ground. The drivers in the power conversion circuits 101-104 respectively receive the pulse width modulated signals PWM1-PWM4 provided by the multi-phase power supply controller 110, control on and off states of the corresponding transistors according to the received pulse width modulated signal, and charge the output capacitor Cout of the current phase, to generate output voltages Vo1-Vo4 of various phases. The output voltages Vo1-Vo4 are combined into one output voltage Vout to drive the load.

The multi-phase power supply controller 110 includes a plurality of PWM controllers 111-114, and each of the PWM controllers 111-114 determines an operation order of the multi-phase power conversion circuits 101-104 according to a feedback signal FB of the feedback control circuit 120, so as to provide the pulse width modulated signals PWM1 to PWM4. The conventional multi-phase power supply controller requires the same number of PWM controllers as the number of power conversion circuits, which not only has the problems of complex structure of the controller, larger circuit size and high circuit cost, but also easily causes the problem of phase-to-phase current oscillation when each PWM controller controls the duty ratio of each phase, thereby affecting accuracy of current balance of various phases of the multi-phase power supply.

Other conventional multi-phase power supply controllers include phase current balancing circuits to avoid the problem of phase-to-phase current oscillation. However, the structure of the controller in this solution is complex and the circuit size is large, so it is not suitable for the multi-phase power supply with a large phase number.

SUMMARY

In view of the above problems, it is an object according to the present disclosure to provide a control circuit for a multi-phase power conversion circuit and a multi-phase power supply, which can not only solve the problem of phase-to-phase current oscillation but also reduce the circuit size and cost of a controller.

According to one aspect according to the present disclosure, there is provided a control circuit for a multi-phase power conversion circuit, the multi-phase power conversion circuit comprising a plurality of switching circuits which have output terminals being coupled together to supply power to a load, the control circuit comprising: an error amplifier configured to compare a feedback signal of an output voltage with a reference voltage signal and generate an error amplification signal; a pulse width modulation circuit configured to generate an on time signal according to the error amplification signal, and a multi-phase logic control circuit configured to generate a plurality of PWM signals according to the on time signal, which are delayed phase by phase and control on and off states of the plurality of switching circuits, and each of which has a pulse width being consistent with the on time signal.

Optionally, the pulse width modulation circuit is configured to generate an on time signal for a next cycle when a last one of the plurality of PWM signals is detected.

Optionally, the pulse width modulation circuit is configured to hold the output of the on time signal and generate an on time signal of a next cycle after delaying a first time period, in a case that a last one of the plurality of PWM signals is detected while outputting the on time signal.

Optionally, the pulse width modulation circuit is configured to generate forcibly an on time signal of a next cycle, in a case that a last one of the plurality of PWM signals is not detected after a second time period in which the on time signal is output.

Optionally, the multi-phase logic control circuit comprises: a plurality of width-preserving delay units corresponding to the plurality of switching circuits, each width-preserving delay unit being configured to delay an input signal for a predetermined time period to generate a PWM signal for corresponding one of the plurality of switching circuit.

Optionally, the plurality of width-preserving delay units are cascaded in sequence.

Optionally, the plurality of width-preserving delay units are arranged in rows and columns respectively.

Optionally, a first one of the plurality of width-preserving delay units is configured to receive the on time signal, and a last one of the plurality of width-preserving delay units is coupled to the pulse width modulation circuit to provide its PWM signal.

Optionally, each of the plurality of width-preserving delay units comprises: a rising-edge delay means configured to delay a rising edge of the input signal by the predetermined time period to generate a first signal; a falling-edge delay means configured to delay a falling edge of the input signal by the predetermined time period to generate a second signal, and a signal combination means configured to combine the first signal and the second signal to obtain an output signal of the width-preserving delay unit.

Optionally, the rising-edge delay means comprises: a first flip-flop having a set terminal receiving the input signal, a reset terminal receiving the first signal, and an output terminal outputting a first trigger signal; a first timer which starts timing when a falling edge of the first trigger signal is detected and generates a first delay signal after the predetermined time period; a first inverter which is configured to invert the first delay signal to obtain the first signal.

Optionally, the falling-edge delay means comprises: a second flip-flop having a set terminal receiving an inverted signal of the input signal, a reset terminal receiving the second signal, and an output terminal outputting a second trigger signal; a second timer which starts timing when a falling edge of the second trigger signal is detected and generates a second delay signal after the predetermined time period; and a second inverter which is configured to invert the second delay signal to obtain the second signal.

Optionally, each of the first timer and the second timer comprises: a first constant-current source and a first transistor coupled between a power supply and a ground, a control terminal of the first transistor receiving an input signal; a first capacitor having a first end coupled to an intermediate node between the first constant-current source and the first transistor, and a second end being grounded, and a second constant-current source and a second transistor coupled between the power supply and the ground, a control terminal of the second transistor being coupled to the first end of the first capacitor, and an intermediate node between the second constant-current source and the second transistor for outputting an output signal.

Optionally, each of the first constant-current source and the second constant-current source is implemented with a third transistor and a fourth transistor, the first timer and the second timer further comprise: a bias means configured to provide a bias current which is proportional to a threshold voltage of the second transistor, wherein the third transistor and the fourth transistor obtain the bias current in a mirror.

Optionally, the bias means comprises: a fifth transistor, a sixth transistor, and a first resistor coupled between the power supply and the ground, the fifth transistor forming a current mirror with the third transistor and the fourth transistor; a second resistor having a first end coupled to the power supply and a second end coupled to the control terminal of the sixth transistor, and a seventh transistor and an eighth transistor coupled between a control terminal of the sixth transistor and ground, each of the seventh transistor and the eighth transistor being coupled in a diode configuration.

According to another aspect according to the present disclosure, there is provided a multi-phase power supply comprising: a multi-phase power conversion circuit including a plurality of switching circuits with output terminals being coupled together to supply power to a load, and the control circuit as mentioned above.

The control circuit for the multi-phase power supply according to the present disclosure comprises an error amplifier, a pulse width modulation circuit and a multi-phase logic control circuit, wherein the multi-phase logic control circuit generates a plurality of PWM signals delayed phase by phase according to an on time signal generated by the pulse width modulation circuit. The multi-phase power supply controller according to the present disclosure has a smaller circuit size and structure, and can have a larger number of phases (for example, 16 phases or 24 phases).

Moreover, the multi-phase logic control circuit includes a plurality of width-preserving delay units to generate a plurality of PWM signals, so that the pulse widths of the plurality of PWM signals are always consistent with the on time signal generated by the pulse width modulation circuit. Thereby, it not only solves the problem of phase-to-phase current oscillation in a case that the switching circuits operate under duty ratios independent for various phases, but also solves the problem of current balance accuracy caused by circuit mismatch.

In other embodiments, the plurality of width-preserving delay units in the multi-phase logic control circuit may be arranged in an array, which may greatly reduce the accumulated delay time of the multi-phase power supply and improve a response speed of the power supply.

In other embodiments, in each width-preserving delay unit, the timer is followed by a logic inverter to provide a stable and consistent delay, so that the circuit structure is simplified and the cost is reduced. Moreover, in some embodiments, a current mirror and a bias means are associated as a group to generate a charge current that is proportional to a threshold voltage of the transistor, so as to compensate for a change of the threshold voltage of the transistor in the logic inverter with temperature. The delay time of the timer is only determined by its capacitance and resistance. Thus, the timer has an improved temperature stability so that various width-preserving delay units can have consistent parameters.

BRIEF DESCRIPTION OF THE DRAWINGS

The above and other objects, features and advantages according to the present disclosure will be more apparent from the following description of embodiments according to the present disclosure with reference to the accompanying drawings, in which.

DESCRIPTION OF THE EMBODIMENTS

Figure 1:
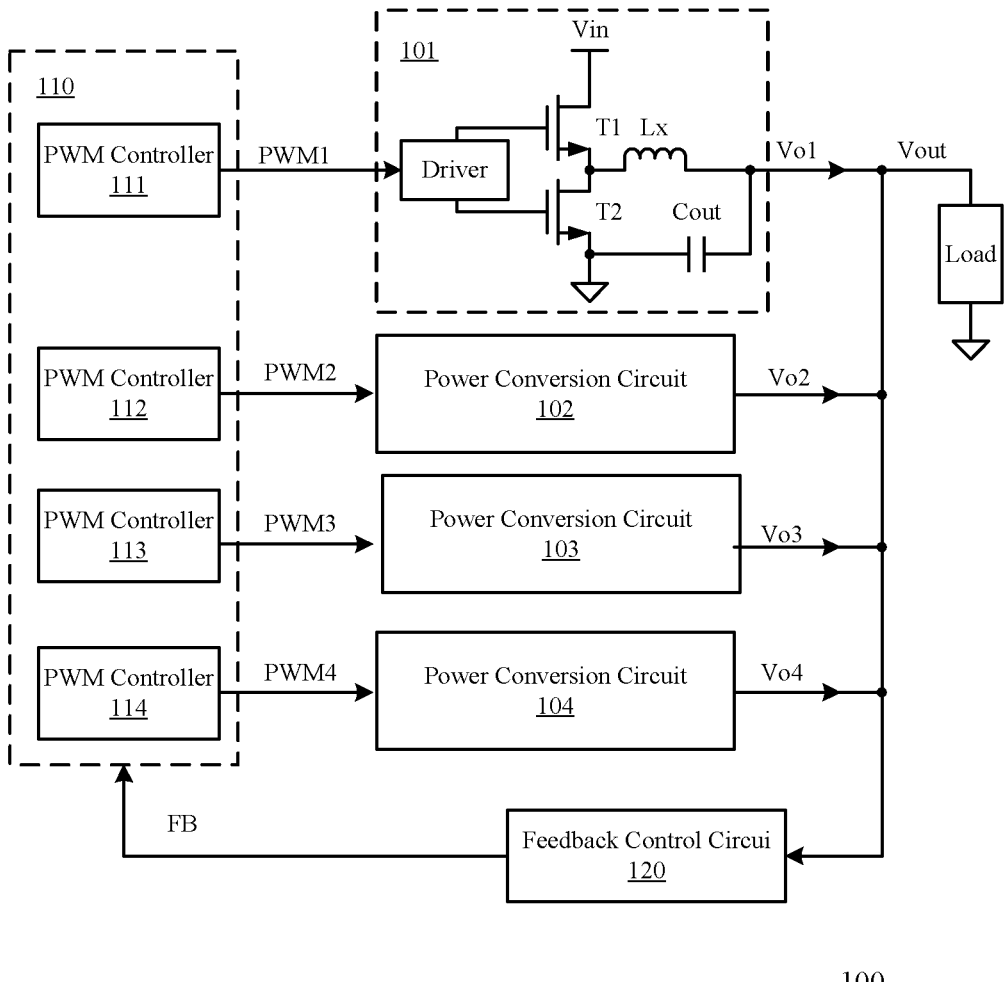
FIG. 1 shows a schematic circuit diagram of a multi-phase power supply according to the prior art.

Various embodiments of the present disclosure will be described in more detail below with reference to the accompanying drawings. Throughout the various figures, like elements are denoted by the same or similar reference numerals. For the sake of clarity, various parts in the drawings are not drawn to scale, moreover, some well-known parts may not be shown.

It should be understood that in the following description, the term "circuit" refers to a conductive loop formed by at least one component or sub-circuit through an electrical or electromagnetic connection. When a component or circuit is "connected" to another component, or a component/circuit is "connected" between two nodes, it may be directly connected or coupled to another component, or there may be an intermediate element, and the connection between the components may be physical, logical, or a combination thereof. Conversely, when a component is to be "directly coupled" or "directly connected" to another component, it means that there is no intermediate element between them.

In the present disclosure, a switching transistor is a transistor operating in a switching mode to provide a current path, including one selected from a bipolar transistor or a field effect transistor. The first terminal and the second terminal of the switching transistor are respectively a high potential terminal and a low potential terminal on the current path, and the control terminal receives a driving signal to control the on and off states of the switching transistor.

The present disclosure can be presented in various forms, and some examples will be described below.

Figure 2:
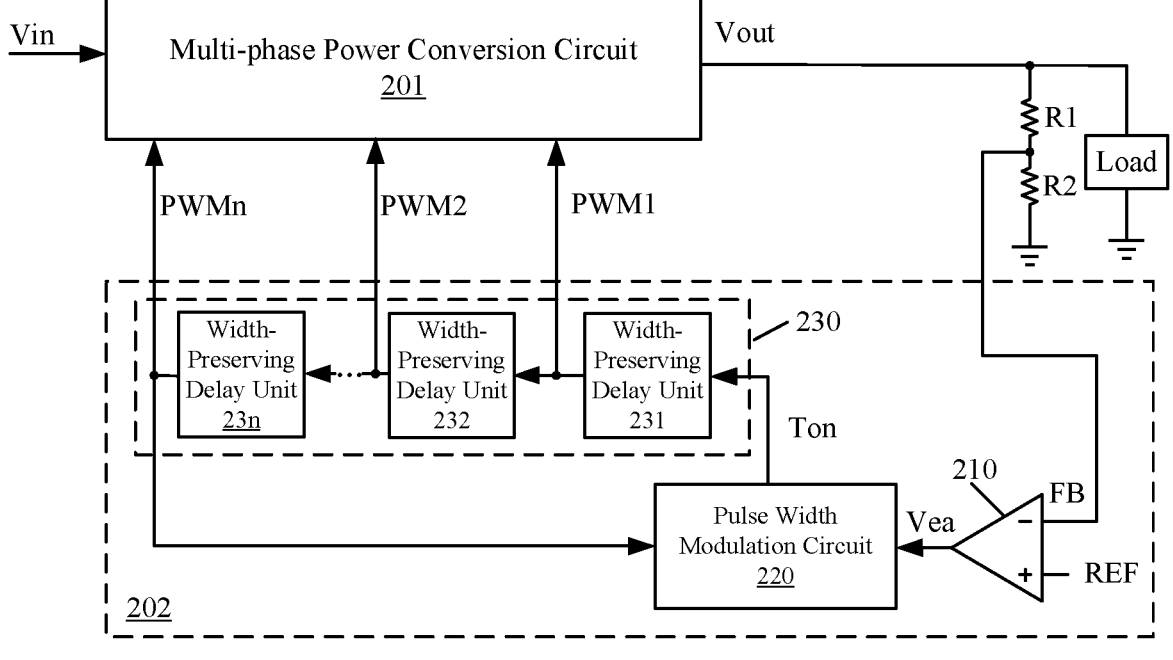
FIG. 2 shows a schematic circuit diagram of a multi-phase power supply according to an embodiment of the present disclosure.
Figure 3:
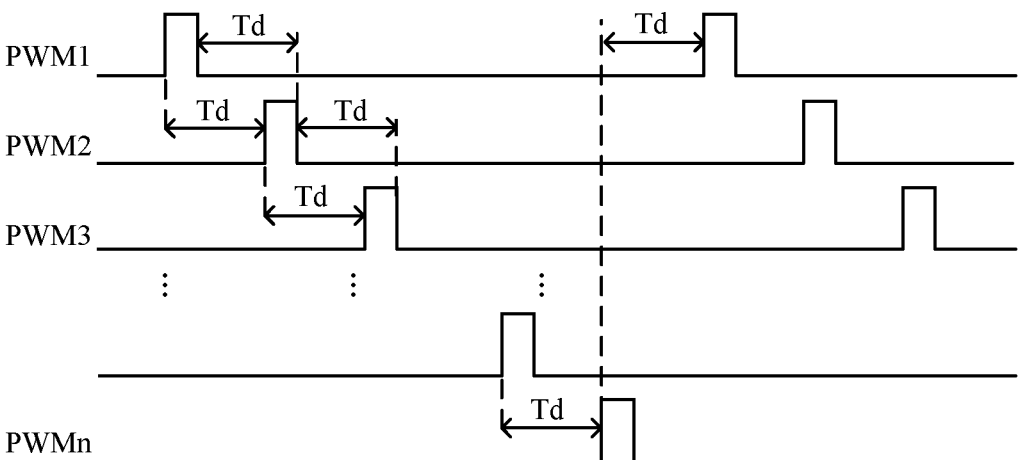
FIG. 3 shows timing charts of a plurality of PWM signals in a multi-phase power supply according to an embodiment of the present disclosure.

FIG. 2 shows a schematic circuit diagram of a multi-phase power supply according to an embodiment of the present disclosure, and FIG. 3 shows timing charts of a plurality of PWM signals in the multi-phase power supply according to an embodiment of the present disclosure. As shown in FIG. 2, the multi-phase power supply 200 according to the embodiment of the present disclosure includes a multi-phase power conversion circuit 201 and a control circuit 202. The multi-phase power conversion circuit 201 includes n switching circuits (n is an integer greater than 1) being coupled together to supply power to a load. Each switching circuit has the same structure as that of the power conversion circuits 101-104 in FIG. 1, for example, including a driver, switching transistors T1 and T2, an inductor Lx and an output capacitor Cout. The switching transistors T1 and T2 are coupled between an input voltage Vin and a ground. The inductor Lx has a first end being coupled to a intermediate node of the switching transistors T1 and T2, and a second end being coupled to a first end of the output capacitor Cout, and a second end of the output capacitor Cout is coupled to the ground. Under the control of the control circuit 201, each switching circuit transfers power of the input voltage Vin to the output capacitor Cout for storage. Finally, the power is combined into an output voltage Vout to drive the load. The control circuit 201 is configured to provide PWM signals (PWM1-PWMn) based on the output voltage Vout, with a number corresponding to the switching circuits so as to control the switching circuits respectively.

As shown in FIG. 2, the control circuit 201 includes an error amplifier 210, a pulse width modulation circuit 220, and a multi-phase logic control circuit 230. The error amplifier 210 compares a feedback signal FB of the output voltage Vout with a reference voltage signal REF, and determines an error between the actual output voltage of the multi-phase power supply and the desired output voltage, to generate an error amplification signal Vea. The pulse width modulation circuit 220 is configured to control a proportional relationship between an on time and a freewheeling time of the plurality of switching circuits according to the error amplification signal Vea, to generate an on time signal Ton. The multi-phase logic control circuit 230 is configured to generate a plurality of PWM signals (i.e., PWM1-PWMn), which are delayed phase by phase, according to the on time signal Ton to control on and off states of the switching circuits respectively. Here, each PWM signal has a pulse width corresponding to that of the on time signal Ton.

In this embodiment, the multi-phase logic control circuit 230 generates the plurality of PWM signals with a width-preserving pulse delay technique to ensure stability of phase currents of the switching circuits of various phases. Thereby, it solves the problem of phase-to-phase current oscillation, and simplifies the circuit.

Optionally, the multi-phase logic control circuit 230 includes n width-preserving delay units (i.e., width-preserving delay units 231-23$n$) corresponding to the n switching circuits. The n width-preserving delay units are cascaded in sequence, and each width-preserving delay unit is configured to delay an input signal by a predetermined time period Td so as to generate a PWM signal for corresponding one of the plurality of switching circuit. A first one of the n width-preserving delay units (i.e., the width-preserving delay unit 231) is coupled to the pulse width modulation circuit 220 to receive the on time signal Ton, and a last one of the n width-preserving delay units (i.e., the width-preserving delay unit 23$n$) is coupled to the pulse width modulation circuit 220 to provide its own PWM signal (i.e. the signal PWMn).

As shown in FIG. 2, the on time signal Ton generated by the pulse width modulation circuit 220 is supplied to a series of width-preserving delay units 231-23$n$, which sequentially delay the received signal to generate signals PWM1-PWMn, as shown in FIG. 3. When the pulse width modulation circuit 220 detects that the PWM signal is output from the last width-preserving delay unit 23$n$, an on time signal Ton of a next cycle is generated.

Optionally, when the PWM signal output from the last delay unit 23$n$ reaches the pulse width modulation circuit 220, if the pulse width modulation circuit 220 has not yet output the on time signal Ton of the current cycle, it is forced to hold the output of the on time signal Ton, and generates an on time signal Ton of a next cycle after delaying a first time period Ton_min.

Optionally, in some other embodiments, after the pulse width modulation circuit 220 outputs the on time signal Ton of the current cycle, if the last PWM signal output from the width-preserving delay unit 23$n$ is not detected within the second time period Tmax, the pulse width modulation circuit 220 is forced to output the on time signal Ton of the next cycle.

The above two control methods of the pulse width modulation circuit 220 can ensure that an oscillator, which is formed by connecting the width-preserving delay units in series, will not stop oscillation due to abnormal loss of pulses, and that a switching frequency of the circuit will not be decreased when a synthesized pulse width exceeds a cycle period at high output power.

It should be noted that the above embodiment is only an example for illustrating the present disclosure, and the present disclosure is not limited thereto. In other embodiments, a plurality of width-preserving delay units 231-23$n$ may be arranged in rows and columns to reduce a total accumulated delay time and improve a response speed of the power supply. For example, a 4*4 array solution can be used to reduce a total delay time of the 16-phase power supply to 8 delay units (each delay unit refers to the delay time of one width-preserving delay unit), thus greatly reducing a delay time of the power supply.

Figure 4:
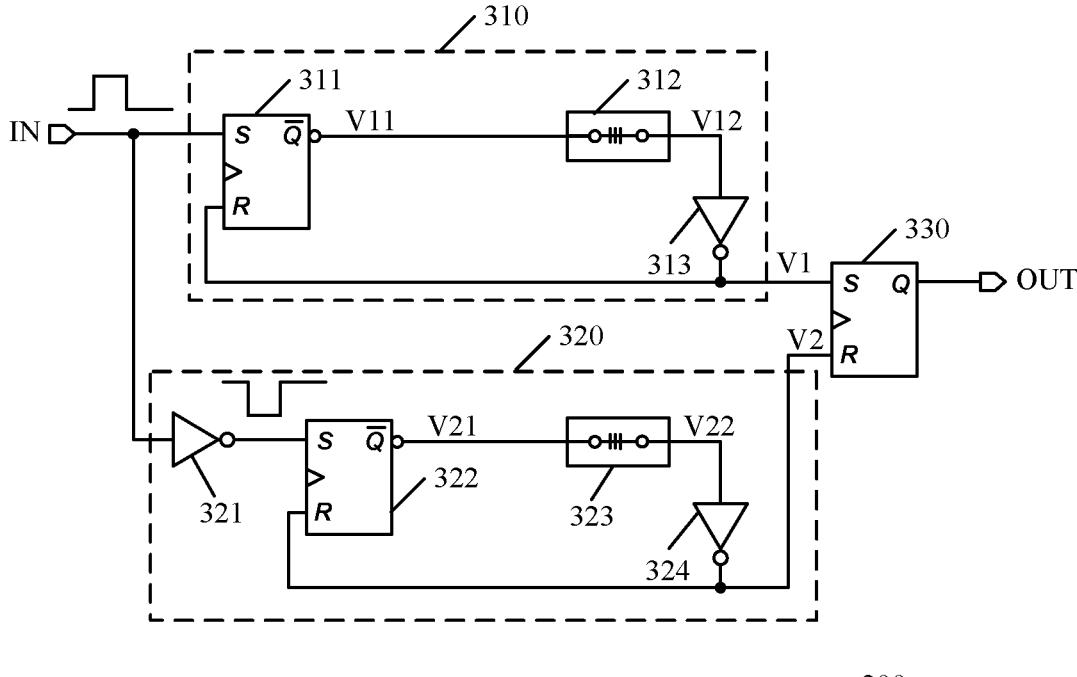
FIG. 4 is a schematic circuit diagram of the width-preserving delay unit in FIG. 2.
Figure 5:
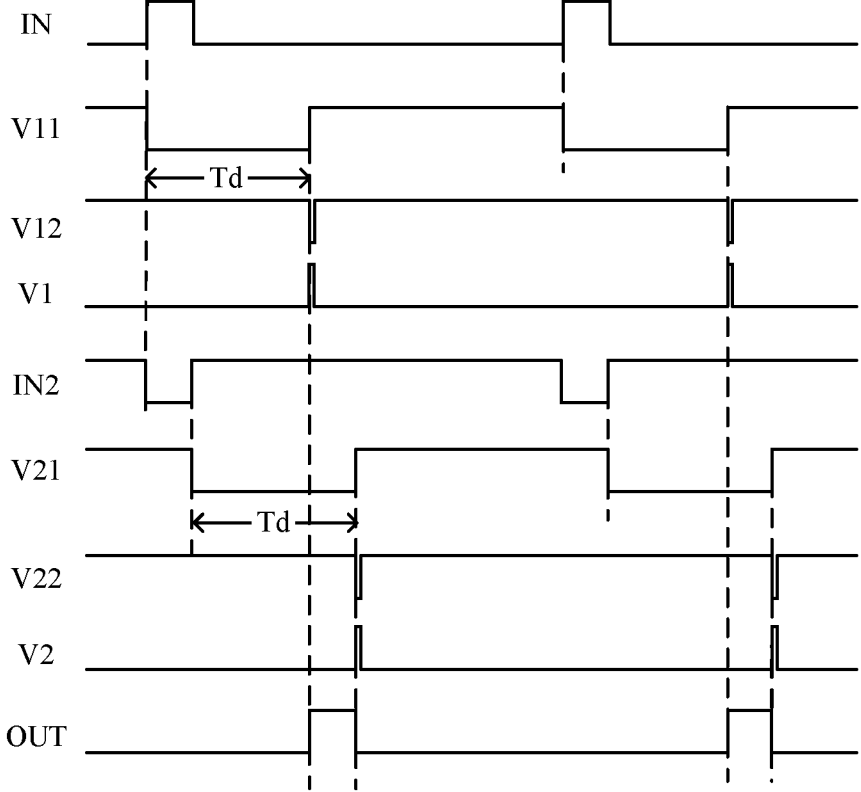
FIG. 5 shows timing charts of various signals when the width-preserving delay unit in FIG. 4 operates.

FIG. 4 shows a schematic circuit diagram of the width-preserving delay unit in FIG. 2, and FIG. 5 shows timing charts of various signals when the width-preserving delay unit in FIG. 4 operates. The width-preserving delay unit 300 in this embodiment delays a rising edge and a falling edge of the input signal by the same time to ensure that the pulse widths of the signals are consistent during the delay process. Specifically, as shown in FIG. 4, the width-preserving delay unit 300 includes a rising-edge delay means 310, a falling-edge delay means 320, and a signal combination means 330. The rising-edge delay means 310 is configured to delay a rising edge of the input signal IN by a predetermined time period Td to generate a first signal V1. The falling-edge delay means 320 is configured to delay the falling edge of the input signal IN by the predetermined time period Td to generate a second signal V2. The signal combination means 330 combines the first signal V1 and the second signal V2 to obtain an output signal OUT.

Optionally, the rising-edge delay means 310 includes a flip-flop 311, a timer 312, and an inverter 313. The flip-flop 311 has a set terminal receiving the input signal IN, a reset terminal coupled to the output terminal of the inverter 313 for receiving the first signal V1, and an output terminal outputting a first trigger signal V11. An input terminal of the timer 312 is configured to receive the first trigger signal V11, and an output terminal of the timer 312 is coupled to the inverter 313 to provide a first delay signal V12, which is inverted by the inverter 313 to obtain the first signal V1.

As shown in FIG. 5, when the flip-flop 311 detects a rising edge of the input signal IN, the first trigger signal V11 is switched from a high level to a low level, and at the same time, when the timer 312 detects a falling edge of the first trigger signal V11 from a high level to a low level, the timer 312 starts timing, and generates a narrow pulse signal after a predetermined time period Td. The inverter 313 inverts it to obtain a first signal V1.

Similarly, the falling-edge delay means 320 includes an inverter 321, a flip-flop 322, a timer 323, and an inverter 324. The inverter 321 has an input terminal for receiving the input signal IN, and an output terminal coupled to a set terminal of the flip-flop 322 for providing an inverted signal IN2 of the signal IN thereto. The flip-flop 322 has a reset terminal coupled to the output terminal of the inverter 324 for receiving the second signal V2, and an output terminal for outputting the second trigger signal V21. The timer 323 has an input terminal coupled to an output terminal of the flip-flop 322 to receive the second trigger signal V21, and an output terminal coupled to an input terminal of the inverter 324 to output the second delay signal V22. The inverter 324 inverts it to obtain a second signal V2.

As shown in FIG. 5, when the flip-flop 322 detects a rising edge of the signal IN2, the second trigger signal V21 is switched from a high level to a low level, and when the timer 323 detects a falling edge of the second trigger signal V21 from the high level to the low level, the timer 323 starts timing, and generates a narrow pulse signal after a predetermined time period Td. The inverter 324 inverts it to obtain the second signal V2.

Optionally, the signal combination means 330, for example, an RS flip-flop, receives the first signal V1 at a set terminal thereof and receives the second signal V2 at a reset terminal thereof, and obtains an output signal OUT according to the first signal V1 and the second signal V2.

Figure 6:
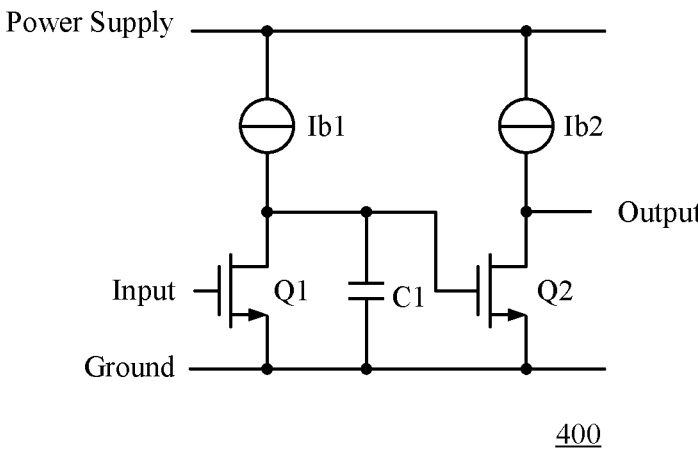
FIG. 6 shows a schematic circuit diagram of the timer in FIG. 4.

FIG. 6 shows a schematic circuit diagram of the timer in FIG. 4. As shown in FIG. 6, the timer 400 in this embodiment may may consist of two cascaded logic inverters and a capacitor between the two logic inverters. Specifically, the timer 400 includes constant-current sources Ib1 and Ib2, transistors Q1 and Q2, and a capacitor C1. The constant-current source Ib1 and the transistor Q1 are coupled in series between a power supply and a ground. A control terminal of the transistor Q1 receives an input signal of the timer (for example, a first trigger signal V11 and a second trigger signal V21 in FIG. 4). The capacitor C1 has a first end coupled with an intermediate node of the constant-current source Ib1 and the transistor Q1, and a second end being grounded. The constant-current source Ib2 and the transistor Q2 are coupled between the power supply and the ground. A control terminal of the transistor Q2 is coupled to a first end of the capacitor C1. An intermediate node of the constant-current source Ib2 and the transistor Q2 outputs an output signal of the timer (for example, a first delay signal V12 and a second delay signal V22 in FIG. 4).

When an input signal changes from a logic high level to a logic low level, the transistor Q1 is turned off, and the constant-current source Ib1 begins to charge the capacitor C1. When a voltage across the capacitor C1 exceeds a threshold voltage of the transistor Q2, the transistor Q2 is switched from an off state to an on state, and an output of the timer changes from a logic high level to a logic low level. It can be seen that a time period required for a voltage across the capacitor C1 to rise to a threshold voltage of the transistor Q2 is the delay time of the timer 400 from a falling edge of the input signal.

Figure 7:
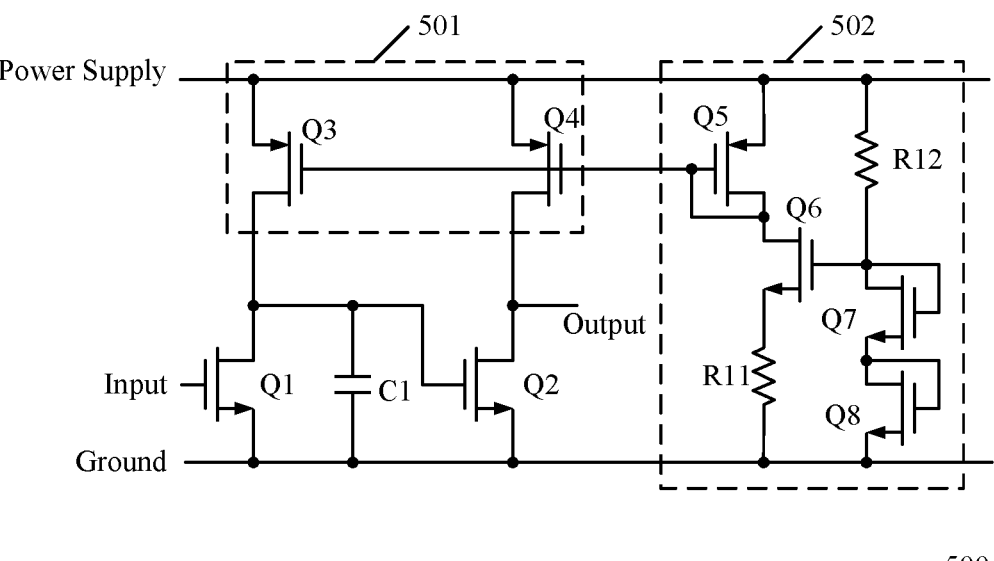
FIG. 7 shows another schematic circuit diagram of the timer in FIG. 4.

FIG. 7 shows another schematic circuit diagram of the timer in FIG. 4. The timer 500 in this embodiment can improve the parameter consistency and the temperature stability among different width-preserving delay units. As shown in FIG. 7, the timer 500 includes a mirrored constant-current source 501, transistors Q1 and Q2, a capacitor C1, and a bias means 502. The mirrored constant-current source 501 includes transistors Q3 and Q4, which have the same function as those of the constant-current sources Ib1 and Ib2 in FIG. 6, to provide a constant charging current. The transistors Q3 and Q1 are coupled between a power supply and a ground. A control terminal of the transistor Q1 receives an input signal of the timer (for example, the first trigger signal V11 and the second trigger signal V21 in FIG. 4). The capacitor C1 has a first end coupled with an intermediate node of the transistors Q3 and Q1, and a second end being grounded. The transistor Q4 and the transistor Q2 are coupled between the power supply and the ground. A control terminal of the transistor Q2 is coupled to a first end of the capacitor C1. An intermediate node of the transistor Q4 and the transistor Q2 outputs an output signal of the timer (for example, a first delay signal V12 and a second delay signal V22 in FIG. 4).

In addition, the bias means 502 is configured to provide a bias current which is proportional to a threshold voltage of the transistor Q2, and which is mirrored by the transistors Q3 and Q4. Specifically, the bias means 502 includes transistors Q5 to Q8 and resistors R11 and R12. The transistor Q5, the transistor Q6 and the resistor R11 are coupled between a power supply and a ground. The transistor Q5 forms a current mirror with the transistors Q3 and Q4. A first end of the resistor R12 is coupled with the power supply, a second end of the resistor R12 is coupled with a control terminal of the transistor Q6. The transistors Q7 and Q8 are coupled between the control terminal of transistors Q6 and the ground, each of which is coupled into a diode configuration.

The transistors Q1 to Q8 in this embodiment are of the same size. The transistors Q7 and Q8 are coupled in series to generate a voltage which is twice of the threshold voltage. After a threshold voltage of the transistor Q6 is subtracted, the resistor R11, which is coupled to a source of the transistor Q6, is applied with a voltage which is one time of the threshold voltage. Thus, a current in the current mirror circuit is proportional to one time of the threshold voltage. Because the current is proportional to the threshold voltage, a voltage generated by charging the capacitor C1 with the current can compensate a change of the threshold voltage of the transistor Q2 with the temperature, so that the parameters of different width-preserving delay units can be consistent.

It can be understood that the multi-phase power supply according to the embodiment of the present disclosure can be applied to power conversion circuits of various typologies. The structure of the power circuit includes, but is not limited to, typologies such as a floating Buck-type power circuit, a grounded Buck-type power circuit, a flyback-type power circuit, a Buck-boost type power circuit, a Boost type power circuit, and the like.

To sum up, the control circuit for the multi-phase power supply according to the present disclosure comprises an error amplifier, a pulse width modulation circuit and a multi-phase logic control circuit, wherein the multi-phase logic control circuit generates a plurality of PWM signals delayed phase by phase according to an on time signal generated by the pulse width modulation circuit. The multi-phase power supply controller according to the present disclosure has a smaller circuit size and structure, and can have a larger number of phases (for example, 16 phases or 24 phases).

Moreover, the multi-phase logic control circuit includes a plurality of width-preserving delay units to generate a plurality of PWM signals, so that the pulse widths of the plurality of PWM signals are always consistent with the on time signal generated by the pulse width modulation circuit. Thereby, it not only solves the problem of phase-to-phase current oscillation in a case that the switching circuits operate under duty ratios independent for various phases, but also solves the problem of current balance accuracy caused by circuit mismatch.

In other embodiments, the plurality of width-preserving delay units in the multi-phase logic control circuit may be arranged in an array, which may greatly reduce the accumulated delay time of the multi-phase power supply and improve a response speed of the power supply.

In other embodiments, in each width-preserving delay unit, the timer is followed by a logic inverter to provide a stable and consistent delay, so that the circuit structure is simplified and the cost is reduced. Moreover, in some embodiments, a current mirror and a bias means are associated as a group to generate a charge current that is proportional to a threshold voltage of the transistor, so as to compensate for a change of the threshold voltage of the transistor in the logic inverter with temperature. The delay time of the timer is only determined by its capacitance and resistance. Thus, the timer has an improved temperature stability so that various width-preserving delay units can have consistent parameters.

In the above description, the well-known structural elements and steps are not explained in detail. However, it will be understood by those skilled in the art that the corresponding structural elements and steps can be realized by various technical means. Moreover, in order to form the same structural elements those skilled in the art may devise methods that are not exactly the same as those described above. Moreover, although the embodiments are described separately above this does not mean that the measures in the embodiments cannot be advantageously used in combination.

These embodiments are not exhaustively described in all detail in accordance with the present disclosure practices such as the above and are not limited to specific embodiments of the invention only. Obviously, according to the above description, many modifications and changes can be made. These embodiments are selected and specifically described in this specification in order to better explain the principle and practical application of the present disclosure, so that technicians in the technical field can make good use of the present disclosure and its modification based on the present disclosure. The scope of protection of the present disclosure rights shall be subject to the scope defined in the present disclosure's claims.

What is claimed is:

1. A control circuit for a multi-phase power conversion circuit, the multi-phase power conversion circuit comprising a plurality of switching circuits which have output terminals being coupled together to supply power to a load, the control circuit comprising:

an error amplifier configured to compare a feedback signal of an output voltage with a reference voltage signal and generate an error amplification signal;

a pulse width modulation circuit configured to generate an on time signal according to the error amplification signal, and a multi-phase logic control circuit configured to generate a plurality of PWM signals according to the on time signal, which are delayed phase by phase and control on and off states of the plurality of switching circuits, and each of which has a pulse width being consistent with the on time signal, wherein the multi-phase logic control circuit comprises:

a plurality of width-preserving delay units corresponding to the plurality of switching circuits, each width-preserving delay unit being configured to delay an input signal for a predetermined time period to generate a PWM signal for corresponding one of the plurality of switching circuit, each of the plurality of width-preserving delay units comprises:

a rising-edge delay means configured to delay a rising edge of the input signal by the predetermined time period to generate a first signal;

a falling-edge delay means configured to delay a falling edge of the input signal by the predetermined time period to generate a second signal, and a signal combination means configured to combine the first signal and the second signal to obtain an output signal of the width-preserving delay unit.

2. The control circuit according to claim 1, wherein the pulse width modulation circuit is configured to generate an on time signal for a next cycle when a last one of the plurality of PWM signals is detected.

3. The control circuit according to claim 1, wherein the pulse width modulation circuit is configured to hold the output of the on time signal and generate an on time signal of a next cycle after delaying a first time period, in a case that a last one of the plurality of PWM signals is detected while outputting the on time signal.

4. The control circuit according to claim 1, wherein the pulse width modulation circuit is configured to generate forcibly an on time signal of a next cycle, in a case that a last one of the plurality of PWM signals is not detected after a second time period in which the on time signal is output.

5. The control circuit according to claim 1, wherein the plurality of width-preserving delay units are cascaded in sequence.

6. The control circuit according to claim 1, wherein the plurality of width-preserving delay units are arranged in rows and columns respectively.

7. The control circuit according to claim 1, wherein a first one of the plurality of width-preserving delay units is configured to receive the on time signal, and a last one of the plurality of width-preserving delay units is coupled to the pulse width modulation circuit to provide its PWM signal.

8. The control circuit according to claim 1, wherein the rising-edge delay means comprises:
   a first flip-flop having a set terminal receiving the input signal, a reset terminal receiving the first signal, and an output terminal outputting a first trigger signal;
   a first timer which starts timing when a falling edge of the first trigger signal is detected and generates a first delay signal after the predetermined time period;
   a first inverter which is configured to invert the first delay signal to obtain the first signal.

9. The control circuit according to claim 8, wherein the falling-edge delay means comprises:
   a second flip-flop having a set terminal receiving an inverted signal of the input signal, a reset terminal receiving the second signal, and an output terminal outputting a second trigger signal;
   a second timer which starts timing when a falling edge of the second trigger signal is detected and generates a second delay signal after the predetermined time period; and
   a second inverter which is configured to invert the second delay signal to obtain the second signal.

10. The control circuit according to claim 9, wherein each of the first timer and the second timer comprises:
   a first constant-current source and a first transistor coupled between a power supply and a ground, a control terminal of the first transistor receiving an input signal;
   a first capacitor having a first end coupled to an intermediate node between the first constant-current source and the first transistor, and a second end being grounded, and
   a second constant-current source and a second transistor coupled between the power supply and the ground, a control terminal of the second transistor being coupled to the first end of the first capacitor, and an intermediate node between the second constant-current source and the second transistor for outputting an output signal.

11. The control circuit according to claim 10, wherein each of the first constant-current source and the second constant-current source is implemented with a third transistor and a fourth transistor,
   the first timer and the second timer further comprise:
   a bias means configured to provide a bias current which is proportional to a threshold voltage of the second transistor, wherein the third transistor and the fourth transistor obtain the bias current in a mirror.

12. The control circuit according to claim 11, wherein the bias means comprises:
   a fifth transistor, a sixth transistor, and a first resistor coupled between the power supply and the ground, the fifth transistor forming a current mirror with the third transistor and the fourth transistor;
   a second resistor having a first end coupled to the power supply and a second end coupled to the control terminal of the sixth transistor, and
   a seventh transistor and an eighth transistor coupled between a control terminal of the sixth transistor and ground, each of the seventh transistor and the eighth transistor being coupled in a diode configuration.

13. A multi-phase power supply comprising:
   a multi-phase power conversion circuit including a plurality of switching circuits with output terminals being coupled together to supply power to a load, and
   the control circuit according to claim 1.

\* \* \* \* \*